United States Patent
Xiong et al.

(10) Patent No.: US 9,674,907 B1
(45) Date of Patent: Jun. 6, 2017

(54) INPUT SURGE PROTECTION CIRCUIT AND METHOD FOR A NON-ISOLATED BUCK-BOOST LED DRIVER

(71) Applicant: Universal Lighting Technologies, Inc., Madison, AL (US)

(72) Inventors: Wei Xiong, Madison, AL (US); Candice Ungacta, Huntsville, AL (US)

(73) Assignee: UNIVERSAL LIGHTING TECHNOLOGIES, INC., Madison, AL (US)

( * ) Notice: Subject to any disclaimer, the term of this patent is extended or adjusted under 35 U.S.C. 154(b) by 0 days.

(21) Appl. No.: 15/086,465

(22) Filed: Mar. 31, 2016

Related U.S. Application Data

(60) Provisional application No. 62/145,062, filed on Apr. 9, 2015.

(51) Int. Cl.

| | |
|---|---|
| H05B 37/02 | (2006.01) |
| H05B 41/34 | (2006.01) |
| H05B 33/08 | (2006.01) |
| H02M 1/42 | (2007.01) |
| H02M 1/34 | (2007.01) |
| H02M 3/158 | (2006.01) |

(52) U.S. Cl.
CPC .......... *H05B 33/0815* (2013.01); *H02M 1/34* (2013.01); *H02M 1/42* (2013.01); *H02M 3/1582* (2013.01); *H02M 2001/346* (2013.01)

(58) Field of Classification Search
CPC .......... H05B 37/00; H05B 37/02; H02H 9/06; H05K 13/0023; F41B 15/04; H01H 23/00; H02M 3/335

USPC ......... 315/200 R, 247, 185 S, 291, 307–312, 315/224, 225, 277; 361/111–120, 127
See application file for complete search history.

(56) References Cited

U.S. PATENT DOCUMENTS

| | | | |
|---|---|---|---|
| 6,323,604 B1* | 11/2001 | Boenigk | H05B 41/042 315/194 |
| 8,421,363 B2* | 4/2013 | Li | H05B 41/042 315/209 CD |
| 2009/0231776 A1* | 9/2009 | Kramer | F41H 13/0012 361/232 |
| 2011/0148313 A1* | 6/2011 | Ramaker | H05B 33/0815 315/185 R |

(Continued)

*Primary Examiner* — Douglas W Owens
*Assistant Examiner* — Wei Chan
(74) *Attorney, Agent, or Firm* — Patterson Intellectual Property Law, P.C.; Mark J. Patterson; Gary L. Montle

(57) ABSTRACT

An LED driver is provided with input surge absorbing capacity. A surge protection circuit branch is coupled across output lines from a DC power source, in parallel with and between a filtering capacitor and a non-isolated buck-boost PFC circuit. A variable impedance device such as a spark gap is coupled to a first power line and having a breakdown voltage to operate as an open circuit during normal operating conditions with respect to a peak input voltage across the capacitor. Responsive to a surge condition with respect to excess energy across the capacitor, the spark gap operates as a closed circuit, and a second capacitor coupled between the spark gap and the second line absorbs the excess energy. Responsive to a return to normal operating conditions, the spark gap reverts to an open state and the accumulated surge energy is discharged from the second capacitor to circuit ground.

13 Claims, 2 Drawing Sheets

(56) References Cited

U.S. PATENT DOCUMENTS

2012/0139432 A1\* 6/2012 Mancho-
                        Banuls ............. G01R 19/16576
                                                   315/205
2012/0200230 A1\* 8/2012 Esaki ................. H05B 33/0851
                                                   315/200 R
2014/0085764 A1\* 3/2014 Huo ........................ H02H 9/06
                                                   361/118

\* cited by examiner

INPUT SURGE PROTECTION CIRCUIT AND METHOD FOR A NON-ISOLATED BUCK-BOOST LED DRIVER

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of U.S. Provisional Patent Application No. 62/145,062, dated Apr. 9, 2015, and which is hereby incorporated by reference.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to DC-DC power converters. More particularly, the present invention relates to protection circuitry for single-stage, non-isolated buck-boost power converters with respect to input surge conditions.

Non-isolated power supplies for lighting sources, such as light emitting diode ("LED") arrays, remain a popular choice for low to medium power levels (e.g., 10 W-30 W), due at least in part to their relative simplicity of design and low cost. Among non-isolated drivers, a buck-boost power factor correction ("PFC") topology provides a number of well-known advantages including an ability to produce wide output voltage, relatively simple control and moderate power factor operation.

By way of further comparison, a single-stage non-isolated buck boost type LED driver is an attractive option due to its smaller size, lower cost and higher efficiency with respect to a single-stage isolated LED driver and a dual-stage (PFC+DC-DC converter) LED driver. The single-stage non-isolated buck boost type LED driver functions simultaneously as a PFC stage and AC-DC current controller.

A conventional LED driver 10, an example of which is represented in FIG. 1, may typically include one or more input surge protection devices 12 and electromagnetic interference (hereinafter "EMI") filtering circuitry 13 provided between a sinusoidal AC source 11 and an input rectifier 14. The rectifier and a subsequent power factor correction (hereinafter "PFC") stage 15 convert an AC input to a high voltage DC output, further regulating the power factor and total harmonic distortion. The PFC stage 15 further regulates the output voltage and current across an output capacitor C2 and thereby to a load 16.

Energy storage elements are conventionally used in DC-DC power converters for filtering, or "smoothing," pulsating DC input from, e.g., the rectifier stage to the PFC stage by absorbing peak currents and ripple currents while providing a relatively constant DC voltage output. However, such an energy storage element such as capacitor C1 as illustrated in FIG. 1 cannot be very large (usually 100 nF-330 nF) due to inherent limits of the power factor correction application, which means that the capacitor C1 cannot absorb enough energy during certain (e.g., combination wave) high energy surge conditions, even with the assistance of the input surge protection stage 12. As a result, a large voltage spike could appear across the filtering capacitor C1, as well as across switching elements and other sensitive components associated with the PFC circuit. This high voltage spike could easily damage such components and cause total system failure.

Boost-type PFC circuits as are conventionally known in the art may provide better surge immunity than non-isolated buck-boost type PFC circuits. In such topologies, the presence of the surge protection devices 12 at the front end may be sufficient to enable the circuit to survive a combination wave surge (e.g., 6 kv, 1500 A). A primary reason for this is that the boost converter has a relatively large output capacitor C2 that can absorb the excess energy that passes the conventional surge protection stage 12. Since the output capacitor C2 in such topologies typically is large (e.g., 20 uF to 100 uF, or about 200× more than the filtering capacitor C1), the voltage across the output capacitor will not change much due to the energy surge spike. As a result, the voltage across the PCT circuit components will also not be dramatically affected by the surge condition.

Therefore, it would be desirable to provide improved surge immunity for non-isolated buck-boost type PFC circuits. A more particularly, it would be desirable to provide circuitry to help such PFC converters to survive high energy combination wave surges, by helping to absorb the extra energy that passes after the surge protection stage. As previously mentioned, it is not enough to simply increase the size of the filtering capacitor C1 as that will disable the necessary PFC circuit functionality.

BRIEF SUMMARY OF THE INVENTION

In various embodiments of an LED driver as disclosed herein, a surge absorbing circuit is provided to effectively protect downstream circuit components during an input combination wave surge.

In a particular embodiment, an LED driver as disclosed herein includes a direct current (DC) power source configured to provide DC power across first and second lines. The DC power source may, for example, be formed by a diode rectifier stage coupled to an AC power source and configured to convert AC power into DC power. A filtering capacitor is coupled across an output end of the DC power source, between the DC power source and a PFC circuit. A surge protection circuit branch is coupled across the output end of the DC power source and between the capacitor and the PFC circuit. The surge protection circuit branch is configured to operate as an open circuit during normal operating conditions with respect to a peak input voltage across the capacitor. Responsive to a surge condition with respect to excess energy across the capacitor, the surge protection circuit is further configured to absorb the excess energy within the circuit branch, and is responsive to a return from the surge condition to normal operating conditions with respect to the peak input voltage across the capacitor, to revert to operation as an open circuit.

In one aspect of an embodiment of the LED driver as disclosed herein, the surge protection circuit branch may include a variable impedance device coupled to the first line, and configured to form a high impedance path during normal operating conditions and further configured in response to a surge condition with respect to excess energy across the energy storage element to form a low impedance path. The variable impedance device may, for example, be formed of a spark gap having a breakdown voltage designed to be greater than the peak input voltage during normal operating conditions.

In another aspect of an embodiment of the LED driver as disclosed herein, the surge protection circuit branch may further include a second capacitor coupled between the variable impedance device and the second line, and a resistance coupled in parallel with the second capacitor and configured to discharge energy from the second capacitor to ground in response to a transition by the variable impedance device from a low impedance path to a high impedance path.

In another aspect of an embodiment of the LED driver as disclosed herein, the second capacitor may be configured to charge from substantially zero in accordance with a surge condition and to discharge the energy accumulated during the surge condition to circuit ground in response to the transition by the variable impedance device from the low impedance path to the high impedance path.

In another aspect of an embodiment of the LED driver as disclosed herein, the PFC circuit is a buck-boost PFC circuit. Accordingly, an inductive element may, for example, be coupled on a first end to the first line, and a switching element further coupled between a second end of the inductive element and the second line, with an output capacitor coupled across the inductive element and configured to provide output power to a load.

In another aspect of an embodiment of the LED driver as disclosed herein, the second capacitor may be provided with a capacitance value at least 60× a capacitance value for the input filtering capacitor. For example, whereas the filtering capacitor may typically have a capacitance of about 100 nF-330 nF, the surge absorbing capacitor may be presented with a capacitance of about 20 uF-100 uF.

DETAILED DESCRIPTION OF THE INVENTION

Various embodiments of a surge absorber circuit for an LED driver may now be described in accordance with the present invention, and by illustrative reference to FIG. 2. The relevant disclosure is limited to the LED driver circuit and associated components, and does not expressly reference additional or external components which may be added to the LED driver, without departing from or otherwise affecting the scope of an invention as disclosed herein, including but not limited to: a lighting fixture or luminaire having a housing including the LED driver; a printed circuit board or equivalent upon which one or a plurality of LED elements may be arrayed as a load for the LED driver; and any supplemental surge protection elements, heat dissipation elements or the like.

Figure 1:
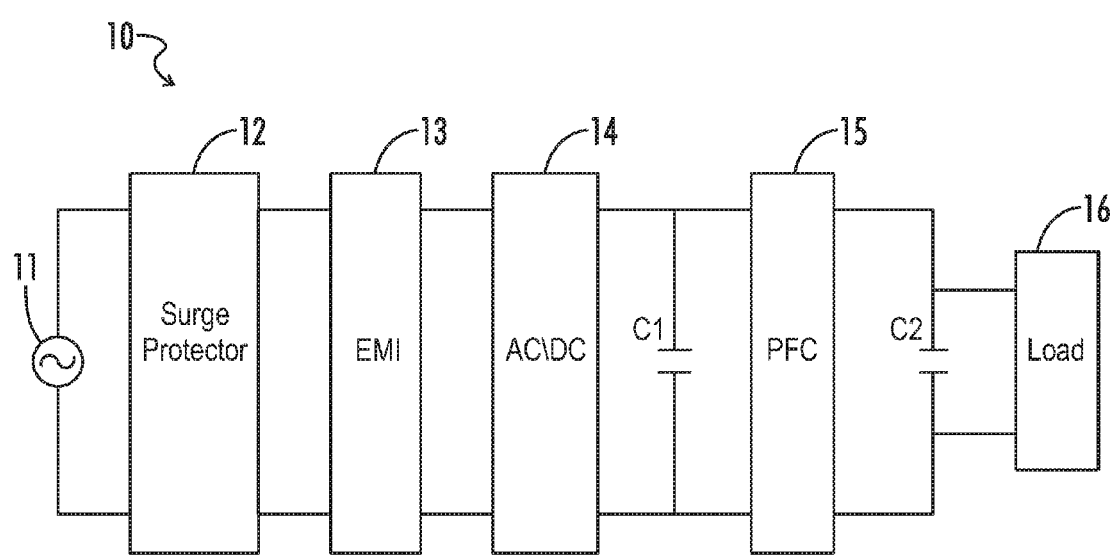
FIG. 1 is a circuit block diagram representing an LED power supply as conventionally known in the art.
Figure 2:
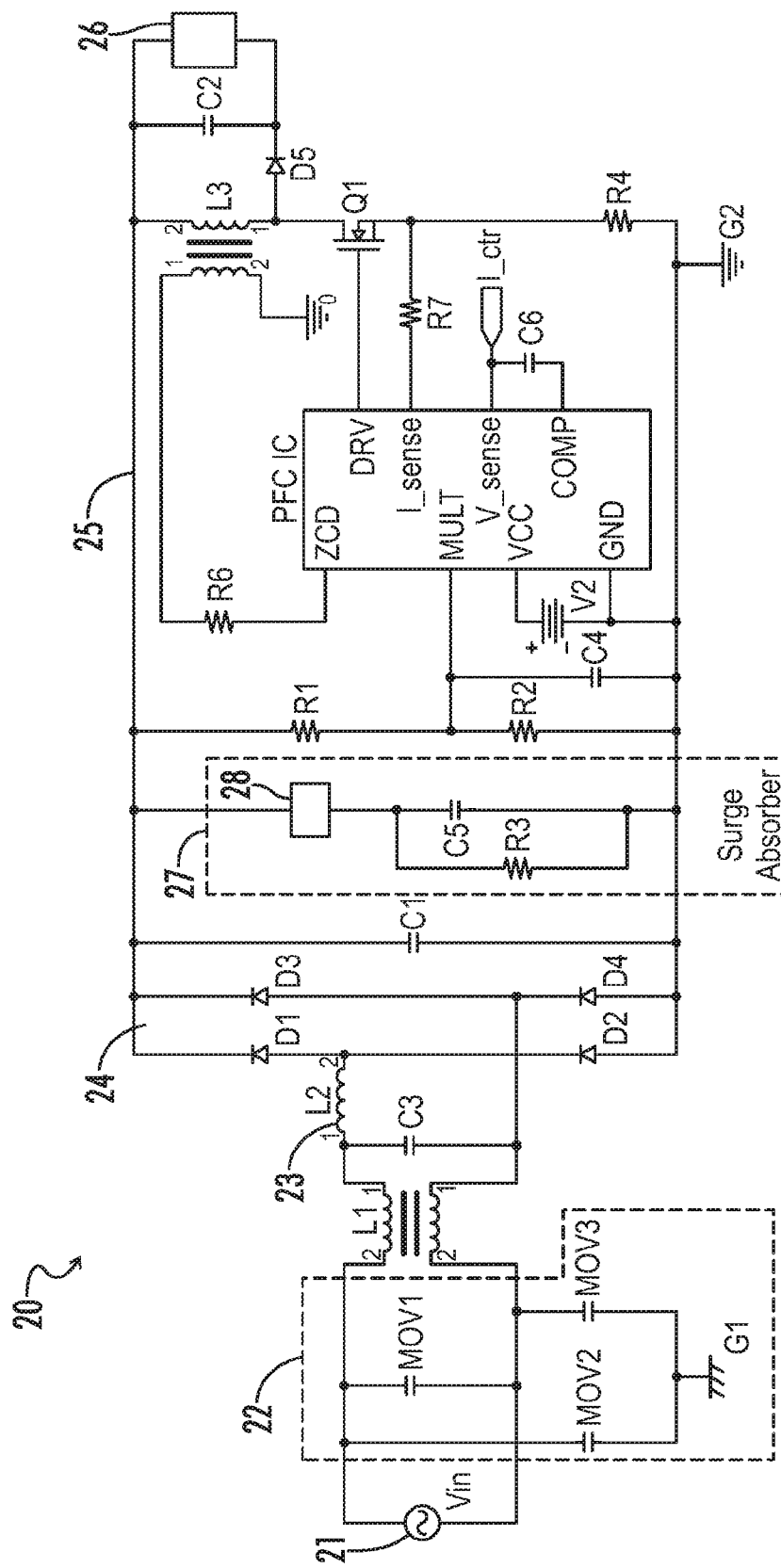
FIG. 2 is a circuit diagram representing an embodiment of an LED power supply according to the present invention.

With respect to an exemplary embodiment of an LED driver as shown in FIG. 2, an input AC source 21 is connected to an input surge protection circuit 22 including three Metal-Oxide Varistors ("MOV"s) which are used to protect the circuit from surge damage. A first MOV1 is connected between line and neutral to clamp the voltage between line and neutral when a high voltage surge occurs between the line and neutral inputs. Additional surge protection elements MOV2 and MOV3 are connected between earth ground to neutral and line, respectively, to clamp the voltage for associated high voltage surges.

An electromagnetic interference (EMI) circuit 23 includes a common mode inductor L1, an EMI filter capacitor C3, and a differential mode inductor L2. Diodes D1-D4 define an input rectifier 24 for converting the AC input supply to a DC power supply. A non-isolated DC-DC buck boost converter 25 is connected to the output of the input diode bridge, which regulates the input line current (Power factor and Thd) and controls the LED current. Capacitor C1 is a high frequency filter capacitor for the converter. Resistors R1 and R2 define a voltage divider coupled across filtering capacitor C1. Inductor L3 as a buck-boost inductor that stores that energy and releases it according to the control of controller PFC IC. Switching element Q1 is controlled by driver signals generated from the controller IC. Diode D5 is a rectifier diode that bypasses the current from the primary winding of the buck-boost inductor L3 to output capacitor C2 when the switching element Q1 is off.

The controller IC as shown in FIG. 2 typically can be a power factor control (PFC) controller integrated circuit (IC) as is known in the art, such as for example the L6562 offered by STMicroelectronics. The controller IC forces the input current to follow the input line voltage so that the power factor is regulated. A feedback signal I_ctr is fed back to the controller IC to regulate the output LED current. A switching element such as MOSFET Q1 is controlled by driver signals provided from the controller IC (terminal DRV) to regulate the power stored in the buck-boost inductor L3, and is coupled to ground via resistor R4. Voltage source V2 is coupled to the controller IC via terminals VCC and GND. The controller IC has a MULT pin that senses the input line signal via a node between the voltage dividing resistors R1 and R2. The controller IC also has a zero current detection (ZCD) pin that is coupled to a secondary winding of the buck-boost inductor L3 via resistor R6, wherein the controller IC may ensure transition mode operation by controlling the turn on time of the switching element Q1. The controller IC also has an $I_{sense}$ pin that senses the current going through the switching element Q1 and resistor R7. The controller IC further includes an internal op amp with a $V_{sense}$ input and COMP as output. Capacitor C6 is an integration capacitor for the control loop.

In an embodiment, a surge protection, or surge absorber, circuit branch 27 is further provided in parallel with the filter capacitor C1 and across the first and second DC input lines to the PFC circuit 25. The surge absorber circuit 27 is configured so that when a surge condition occurs it will absorb the excess energy, and after the surge condition has passed it will disconnect itself from the PFC circuit.

As shown in FIG. 2, an exemplary surge absorber circuit 27 according to the present invention may include a variable impedance device such as a spark gap 28, a surge absorbing energy storage element (here indicated as capacitor C5), and a discharge circuit (here indicated as resistor R3). The variable impedance device 28 is configured to operate as or otherwise create a short circuit when a voltage across the device reaches an associated breakdown threshold voltage, and that further functions like an open circuit when the voltage across the device is less than the breakdown voltage.

In an embodiment, during normal operation of the converter 20, the voltage across the filtering capacitor C1 is the peak of the input line voltage, which is typically much less than the breakdown voltage of the spark gap through proper selection of the voltage rating of the spark gap. For example, if the peak of the input voltage is 312V*1.414=442V, a spark gap that has a 500V breakdown threshold may be selected to ensure that during normal operation of the power converter the spark gap functions as an open circuit. Since the spark gap is an open circuit voltage or otherwise stated presents high impedance when the breakdown voltage has not been exceeded, the discharge element (e.g., resistor R3) will keep the voltage across the capacitor C5 effectively at zero throughout a normal operating condition. The surge absorber circuit branch as a whole is therefore effectively an open circuit during normal operation and will not affect any PFC functionality of the power converter 20.

When a surge condition occurs, a large voltage spike will typically appear across the input of the rectifier diode bridge 24. Part of the resulting energy will be absorbed by the input surge protection circuit 22 (e.g., MOV1-3) and some excess energy will pass through the input diode bridge 24 and reach the filtering capacitor C1. As a result, the filtering capacitor C1 will be charged up to a relatively high voltage, which will exceed the breakdown voltage of the spark gap and force the spark gap to become or otherwise function as a short circuit. As soon as the spark gap effectively shorts itself, the excess energy will be diverted to and absorbed by the relatively large surge absorbing capacitor C5. Since a capacitance value for this capacitor C5 can be designed to be very large (e.g., 20 uF-100 uF) the energy spike will not cause a significant voltage surge across the capacitor C5, nor will a significant voltage surge be present across the PFC switching element Q1.

Upon lapsing of the surge condition, the voltage across the filtering capacitor C1 returns to normal, wherein the voltage across the spark gap diminishes to less than its respective breakdown voltage, and it once again functions as an open circuit during normal situation. The discharge resistor R3 in parallel with the surge absorbing capacitor C5 helps to discharge all the excess energy, wherein the voltage across C5 drops back to zero during normal operation.

In various embodiments of an LED driver as disclosed herein, such a surge absorber circuit 27 can effectively enable a non-isolated buck-boost type PFC converter topology to survive an input combination wave surge, wherein the desired benefits of low cost, high efficiency and compact size can be practically implemented.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical or physical connection between the connected items or an indirect connection via one or more passive or active intermediary devices.

The term "circuit" means at least either a single component or a multiplicity of components, either active and/or passive, that are coupled together to provide a desired function.

Terms such as "wire," "wiring," "line," "signal," "conductor," and "bus" may be used to refer to any known structure, construction, arrangement, technique, method and/or process for physically transferring a signal from one point in a circuit to another.

The terms "switching element" and "switch" may be used interchangeably and may refer herein to at least: a variety of transistors as known in the art (including but not limited to FET, BJT, IGBT, IGFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:
1. An LED driver comprising:
a direct current (DC) power source configured to provide DC power across first and second lines;
a capacitor coupled across the first and second lines at an output end of the DC power source;
a power factor correction (PFC) circuit coupled across the first and second lines; and a surge protection circuit branch coupled across the first and second lines and between the capacitor and the PFC circuit, wherein the surge protection circuit branch is configured to operate as an open circuit during normal operating conditions with respect to a peak input voltage across the capacitor, responsive to a surge condition with respect to excess energy across the capacitor, to absorb the excess energy within the circuit branch, and responsive to a return from the surge condition to normal operating conditions with respect to the peak input voltage across the capacitor, to revert to operation as an open circuit.

2. The LED driver of claim 1, wherein the surge protection circuit branch comprises a variable impedance device coupled to the first line, and configured to form a high impedance path during normal operating conditions and further configured in response to a surge condition with respect to excess energy across the capacitor to form a low impedance path.

3. The LED driver of claim 2, wherein the variable impedance device comprises a spark gap having a breakdown voltage that is greater than the peak input voltage during normal operating conditions.

4. The LED driver of claim 2, wherein the capacitor coupled across an output end of the DC power source comprises a first capacitor, and the surge protection circuit branch further comprises a second capacitor coupled between the variable impedance device and the second line.

5. The LED driver of claim 4, wherein the surge protection circuit branch further comprises a resistor coupled in parallel with the second capacitor and configured to discharge energy from the second capacitor to ground in response to a transition by the variable impedance device from a low impedance path to a high impedance path.

6. The LED driver of claim 5, wherein the PFC circuit is a buck-boost PFC circuit, comprising:

an inductive element coupled on a first end to the first line;

a switching element coupled between a second end of the inductive element and the second line; and wherein an output capacitor is coupled across the inductive element, the output capacitor configured to provide output power to a load.

7. The LED driver of claim 6, further comprising a diode having an anode coupled to the second end of the inductive element and a cathode coupled to the output capacitor.

8. An LED driver comprising:

a direct current (DC) power source configured to provide DC power across first and second lines;

an energy storage element coupled across the first and second lines at an output end of the DC power source;

a power factor correction (PFC) circuit coupled in parallel with the energy storage element and across the first and second lines at the output end of the DC power source;

a surge protection circuit branch coupled in parallel with and between the energy storage element and the PFC circuit; and wherein the surge protection circuit branch comprises a variable impedance device coupled to the first line, and configured to form a high impedance path during normal operating conditions and further configured in response to a surge condition with respect to excess energy across the energy storage element to form a low impedance path.

9. The LED driver of claim 8, wherein the variable impedance device comprises a spark gap having a breakdown voltage designed to be greater than a peak input voltage to the PFC circuit during normal operating conditions.

10. The LED driver of claim 8, wherein the energy storage element coupled across an output end of the DC power source comprises a first energy storage element, and the surge protection circuit branch further comprises a second energy storage element coupled between the variable impedance device and the second line.

11. The LED driver of claim 10, wherein the surge protection circuit branch further comprises a resistor coupled in parallel with the second energy storage element and configured to discharge energy from the second energy storage element to ground in response to a transition by the variable impedance device from a low impedance path to a high impedance path.

12. The LED driver of claim 11, wherein the PFC circuit is a buck-boost PFC circuit, comprising:

an inductive element coupled on a first end to the first line;

a switching element coupled between a second end of the inductive element and the second line; and wherein an output capacitor is coupled across the inductive element, the output capacitor configured to provide output power to a load.

13. The LED driver of claim 12, further comprising a diode having an anode coupled to the second end of the inductive element and a cathode coupled to the output capacitor.

* * * * *